United States Patent [19]

Hadano

[11] Patent Number: 5,271,001
[45] Date of Patent: Dec. 14, 1993

[54] SYNCHRONOUS TERMINAL STATION SYSTEM

[75] Inventor: Satoru Hadano, Tokyo, Japan

[73] Assignee: NEC Corporation, Japan

[21] Appl. No.: 784,599

[22] Filed: Oct. 30, 1991

[30] Foreign Application Priority Data

Oct. 31, 1990 [JP] Japan .................. 2-295036

[51] Int. Cl.[5] .................. H04J 3/14; G06F 11/16
[52] U.S. Cl. .................. 370/16; 370/100.1;
370/105.5; 340/825.01; 371/8.2; 371/11.2
[58] Field of Search .................. 370/13, 14, 16, 58.1,
370/84.112, 100.1, 105.1, 105.5; 340/826, 827,
825.01, 825.06; 371/8.1, 8.2, 9.1, 11.1, 11.2

[56] References Cited

U.S. PATENT DOCUMENTS

| | | | |
|---|---|---|---|
| 4,497,054 | 1/1985 | Read .................. | 370/16 |
| 4,601,028 | 7/1986 | Huffnan et al. .................. | 370/13 |
| 4,700,348 | 10/1987 | Ise et al. .................. | 371/8.2 |
| 4,964,112 | 10/1990 | Appelmann .................. | 370/13 |
| 5,014,261 | 5/1991 | Shinbashi et al. .................. | 370/16 |
| 5,051,979 | 9/1991 | Chaudhuri et al. .................. | 370/16 |
| 5,146,453 | 9/1992 | Hagler et al. .................. | 370/16 |

Primary Examiner—Douglas W. Olms
Assistant Examiner—Alpus H. Hsu
Attorney, Agent, or Firm—Ostrolenk, Faber, Gerb & Soffen

[57] ABSTRACT

A plurality of working synchronous terminal stations and one standby synchronous terminal station are housed separately and have different synchronous pulse sources. Each working synchronous terminal station receives and multiplexes STM-N signals using its own particular synchronous pulse source and output a resultant transmission signal on its transmission path. The standby synchronous terminal station receives STM-N signals from a failing working synchronous terminal station and reformats the signals into new frames suitable for the standby synchronous terminal station. The standby synchronous terminal station further locates in the signals pointer information indicating the position in a frame where a data portion begins, and modifies the pointer information according to the new frames. The reformatted signals with modified pointer information are multiplexed within the standby synchronous terminal station and transmitted on a standby transmission path.

7 Claims, 6 Drawing Sheets

FIG. 2 FRAME FORMAT FOR STM-1

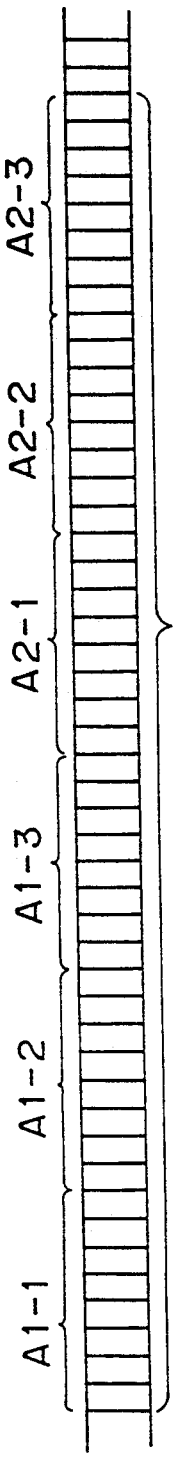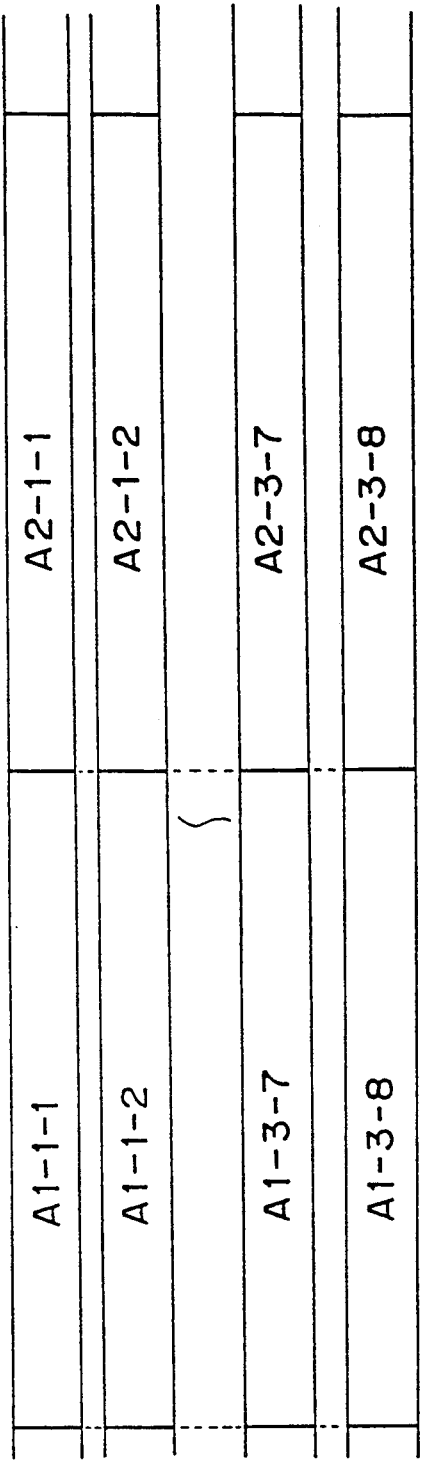
FIG. 4 ONE DATA SELL INDICATES ONE BIT FOR STM-1

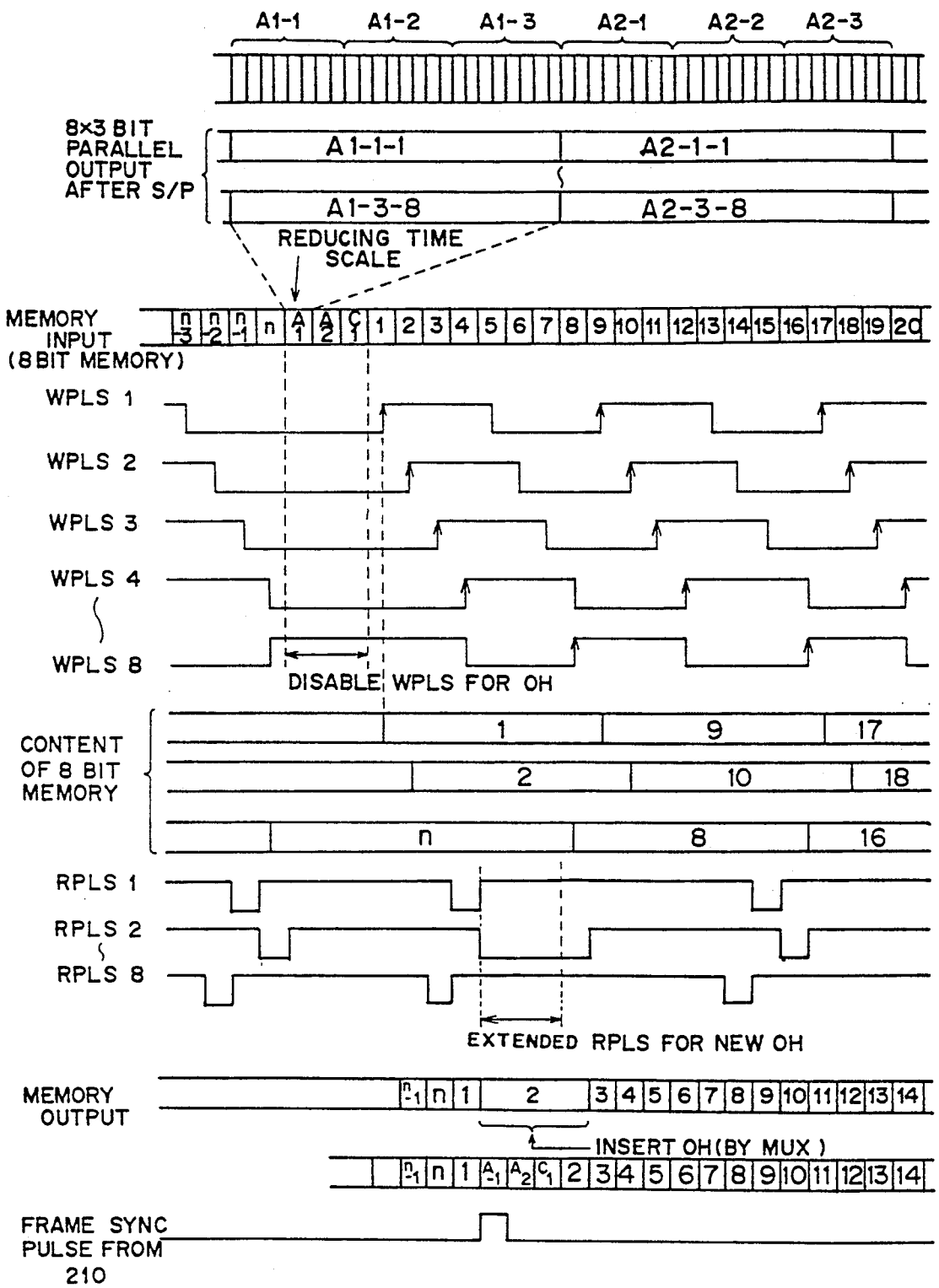
FIG. 5   ONE DATA CELL INDICATES ONE BIT FOR STM-1

SYNCHRONOUS TERMINAL STATION SYSTEM

FIELD OF THE INVENTION

This invention relates to a synchronous terminal station system which synchronously multiplexes a plurality of low order group signals and transmits them to a transmission path. Such a synchronous terminal station system generates a transmission signal which has in each of its frames pointer information that shows the bit time slot in which a leading location of informative data is placed.

BACKGROUND OF THE INVENTION

A conventional synchronous terminal station system consists of a large casing frame that is installed on the floor. Inside this casing is housed at least one working transmission unit and one standby transmission unit. The working transmission unit multiplexes a plurality of frame-synchronized low order group signals, converts them to a high-speed higher order group signal and transmits the converted signal on a transmission path. The synchronous terminal station system also has a monitor circuit to monitor the working transmission unit. When the working transmission unit fails it is switched to the standby transmission unit in response to the output of the monitor circuit. Such a communication system is disclosed in U.S. Pat. No. 4,601,028.

However, in cases where a synchronous terminal station system has to multiplex a large number of low order group signals, it becomes impossible to integrate all of the working transmission units and the standby transmission unit into one casing frame because in this case the scale of the circuits becomes larger. For this reason, it is necessary to divide the working transmission unit and the standby transmission unit into separate casing frames. Each group of low order group signals is multiplexed into a transmission signal, which is in turn transferred to a repeater system or receiving terminal station through a transmission path.

In the event that the working transmission unit for one group of low order group signals fails, the standby transmission unit rather than the working transmission unit will multiplex low order group signals of that group and transmit them. As each transmission unit is housed independently in separate casing frames, each must have an independent synchronous clock source. In situations, where the standby transmission unit is switched on upon a failure, the clock phase and the frame phase of the low order group signals that are inputted into the standby transmission unit are varied from one working transmission unit to another from which the low order group signals are inputted. It is also necessary for the standby transmission unit to adjust the clock phase and frame phase of the low order group signals, transferred from any working transmission unit, to a clock phase and frame phase that are independent of the low order group signals of any working transmission unit. To accomplish this, the low order group signals must be stored in buffer memories for the time required to adjust the phases. In this case, each buffer memory must have a memory capacity for one frame of the low order group signal. For example, when STM-1(STM:Synchronous Transport Module) signals of CCITT Recommendation G.708 are given as the low order group signals, high-speed memories of a large capacity equivalent to 19440 bits for a frame of a STM-1 signal(155.52 Mb/s) are required. This results in the scale of the circuitry becoming extremely large.

SUMMARY OF THE INVENTION

The object of this invention is to avoid increasing the scale of the circuitry. This is done by using pointer information, which shows the time slot in a frame where leading portion of the informative transmission data (pay-load frame) is placed.

According to the present invention, a plurality of working synchronous terminal stations and one standby synchronous terminal station are housed separately and have different synchronous pulse sources. Each working synchronous terminal station receives and multiplexes STM-N signals using its particular synchronous pulse source and outputs the resultant transmission signal on its transmission path. The standby synchronous terminal station receives the STM-N signals from a working synchronous terminal station that fails, and reformats the signals received into new frames that are suitable for the standby synchronous terminal station. The standby synchronous terminal locates in the signals received pointer bytes or information that indicate the position in a frame where the payload frame begins, and modifies the value of the pointer according to the new frames. The reformatted signals with the modified pointer value are then multiplexed within the standby synchronous terminal station and transmitted on a standby transmission path.

DESCRIPTION OF THE FIGURES

FIG. 4, FIG. 5 and FIG. 6 show timing charts for the operation of the pointer conversion unit of FIG. 3.

DESCRIPTION OF THE EMBODIMENT OF THE INVENTION

Figure 1:
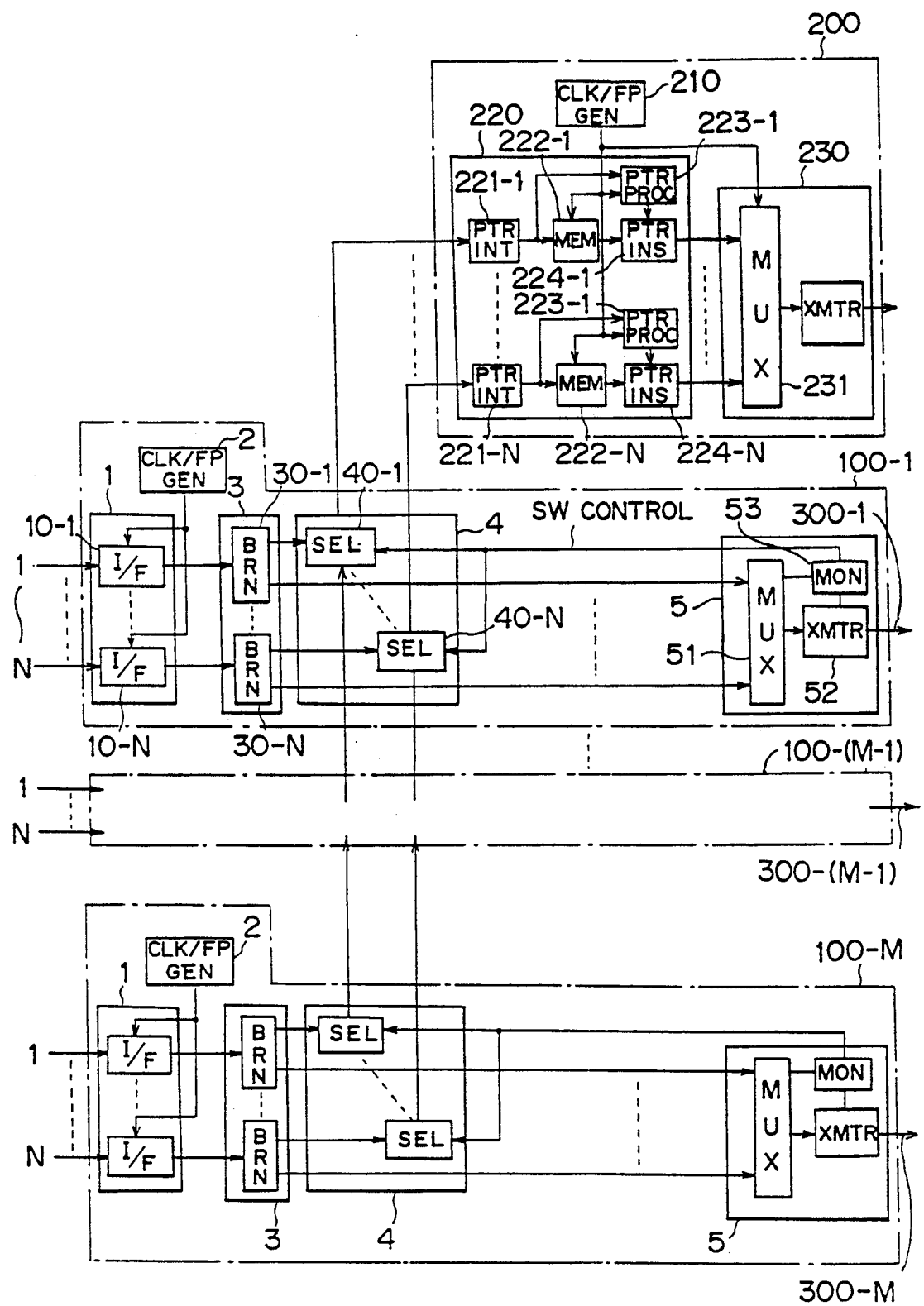
FIG. 1 illustrates a block diagram of an embodiment of this invention.

FIG. 1 illustrates a block diagram of an embodiment of this invention.

In this figure, the synchronous terminal station system consists of the working transmission units 100-1 to 100-M for M groups and a standby transmission unit 200. Each unit is housed in an individual casing frame. The working transmission units 100-1 to 100-M each receive and multiplex N STM-1 signal strings of CCITT recommendation G.708, and transmit them to their respective transmission paths 300-1 to 300-M. A different number of STM-1 signals may be inputted into each working transmission unit. This means that all of the working transmission units do not require the same value of N. However, in this case all Ns are the same and hence, the configurations of the working transmission units 100-1 to 100-(M-1) are identical. However, the working transmission unit 100-M has a slightly different configuration from the others. This point will be explained later.

The working transmission unit 100-1 includes an input section 1, which has interfaces 10-1 to 10-N provided for respective inputs of the STM-1 signals, a pulse generation section 2 for clock pulse and frame pulse signals, a branching section 3 in which one input branches into two outputs, a selection section 4, and a multiplexing and transmission section 5.

The interfaces 10-1 to 10-N have the same circuit configurations and each of these interfaces detects the clock phase and the frame synchronous phase of the input STM-1 signal and adjusts the phases of the input STM-1 signals to be equal to the phase of the clock signal of 155.52 Mb/S and the frame synchronous pulse signal from the pulse generation section 2. The rate of the frame synchronous pulse is 1/19440 times as fast as the clock signal. Circuits that detect the frame phase of a signal and synchronize it with a specific frame synchronous pulse are well known.

Figure 2:
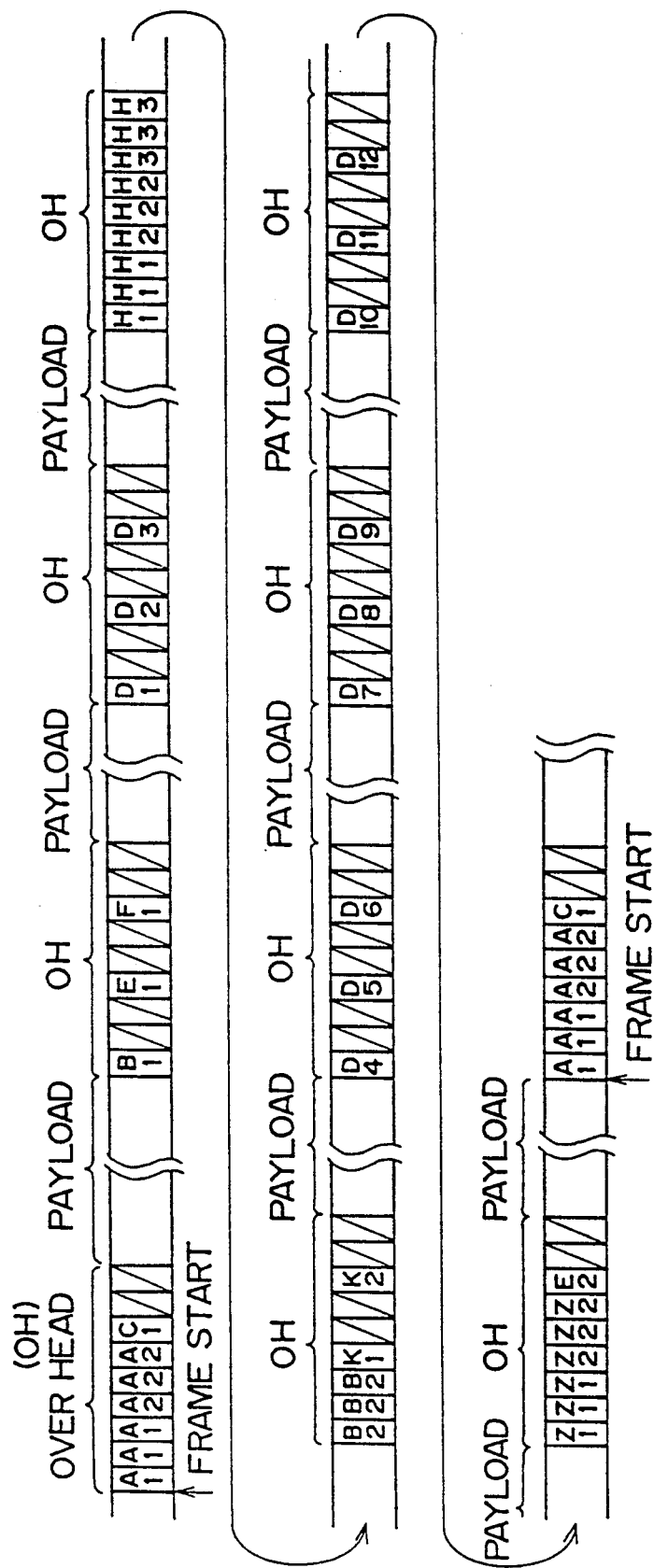
FIG. 2 illustrates a chart which shows a format of a STM-1 signal in the above embodiment.

FIG. 2 illustrates a frame format of a STM-1 signal. The signal rate of the STM-1 signal is 155.52 Mb/S and the frame length is 19440 bits (2430 bytes). One frame consists of nine repetitions of a cycle T which consists of nine byte overhead portion and a payload portion (a framed data string having the transmission information from a terminal station). The leading nine-byte overhead of a one frame signal string includes a six byte frame synchronous signal (A1, A1, A1, A2, A2, A2), and the other nine byte overhead portion contains the information regulated in CCITT Recommendation G.708. In addition, the pointers (H1, H2, H3, each three bytes) are placed into the overhead of the fourth cycle T. The pointers indicate the number of data bits from the last bit of the pointers to the frame containing the leading position of payload frame. The receiving side can then detect the frame leading position in the payload by interpreting the pointers. As shown in FIG. 2, where the payload follows immediately after the last bit of the pointers, the values of the pointers indicate the bit number from the leading bit of the payload to the frame containing the leading location of the data strings.

As shown in FIG. 1, the leading location of the frame synchronous signals of the inputted STM-1 signals conforms to the frame pulse of the pulse generation section 2 by the effect of interfaces 10-1 to 10-N, respectively. A clock signal and frame synchronous pulse from the pulse generation section 2, and a STM-1 signal synchronized with them are outputted through separate signal lines from each of the interfaces 10-1 to 10-N.

The branching section 3 consisting of branching circuits 30-1 to 30-N, respectively, splits the clock signals, frame synchronous pulses and synchronized STM-1 signals from interfaces 10-1 to 10-N into two branches. In this figure, the signal lines which link the interfaces, the branching circuits, the selection circuits, the multiplexing section, and pointer interpreting section 221-1 to 222-N are shown as single lines. However, each of these signal lines actually consists of three lines of the same length as required for the clock signal, the frame synchronous pulse and the STM-1 signal.

The signals (the clock signals, the frame synchronous pulses and the synchronized STM-1 signals) from the branching circuits 30-1 to 30-N are inputted into the multiplexing circuit 51 and are also inputted into the selection circuits 40-1 to 40-N.

The multiplexing circuit 51 multiplexes the STM-1 signals from the branching circuits 30-1 to 30-N and outputs a multiplexed transmission signal of N-times the signal rate(STM-N). Every STM-1 signal inputted into the multiplexing circuit 51 is adjusted in frame synchronization and clock synchronization, resulting in simple synchronous multiplexing.

A transmission circuit 52 then transmits the multiplexed signal to the transmission path 300-1 to 300-M.

A monitor 53 monitors the multiplexing section 51, the transmission circuit 52 and the transmission data. When abnormal conditions are detected, the monitor 53 outputs a switching control signal to the selection circuits 40-1 to 40-N, and switches the outputs of the selection circuits to the standby transmission unit 200.

The selection circuits 40-1 to 40-N in the working transmission unit 100-1 select the clock signal, the frame synchronous pulse and the STM-1 signal from the working transmission unit 100-2 when they don't receive switching control signals from the monitor 53. The respective working transmission units 100-2 to 100-(M-1) have a similar configuration to the working transmission unit 100-1. Under normal condition, the selection circuit of each unit 100-i(i=2 to M−1) selects the clock signal, the frame synchronous pulse and the STM-1 signal from the working transmission unit 100−(i+1).

Only the working transmission unit 100-M has a selection circuit with a different configuration than the others. Under normal condition (when the monitor circuit of the working transmission unit 100-M does not generate a switching control signal), the selection circuit of the working transmission unit 100-M does not output any signals to the working transmission unit 100-(M−1). Under abnormal conditions, it outputs each STM-1 signal to the working transmission unit 100-(M−1). The selection circuits of the working transmission units 100-1 to 100-M are necessary for reducing the number of lines between the respective working transmission units and the standby transmission unit. If these selection circuits are absent, a cable is required between each of the working transmission units 100-1 to 100-M and the standby transmission unit 200 to transmit the split signals from the respective branching circuits. This results in complex wiring.

As shown in FIG. 1, standby transmission unit 200 includes a pointer conversion section 220, a pulse generator 210 which generates a clock signal at the same rate as the STM-1 signals, and a multiplexing and transmission section 230.

The pointer conversion section 220 includes pointer interpretation sections 221-1 to 221-N, memory circuits 222-1 to 222-N, pointer processing units 223-1 to 223-N and pointer insertion sections 224-1 to 224-N. The pointer conversion section 220 receives in parallel the STM-1 signals, the clock signals and the frame synchronous pulse signals from the selection circuits 40-1 to 40-N. Each of the selection circuits consists of the same combination of circuits as described above.

Figure 3:
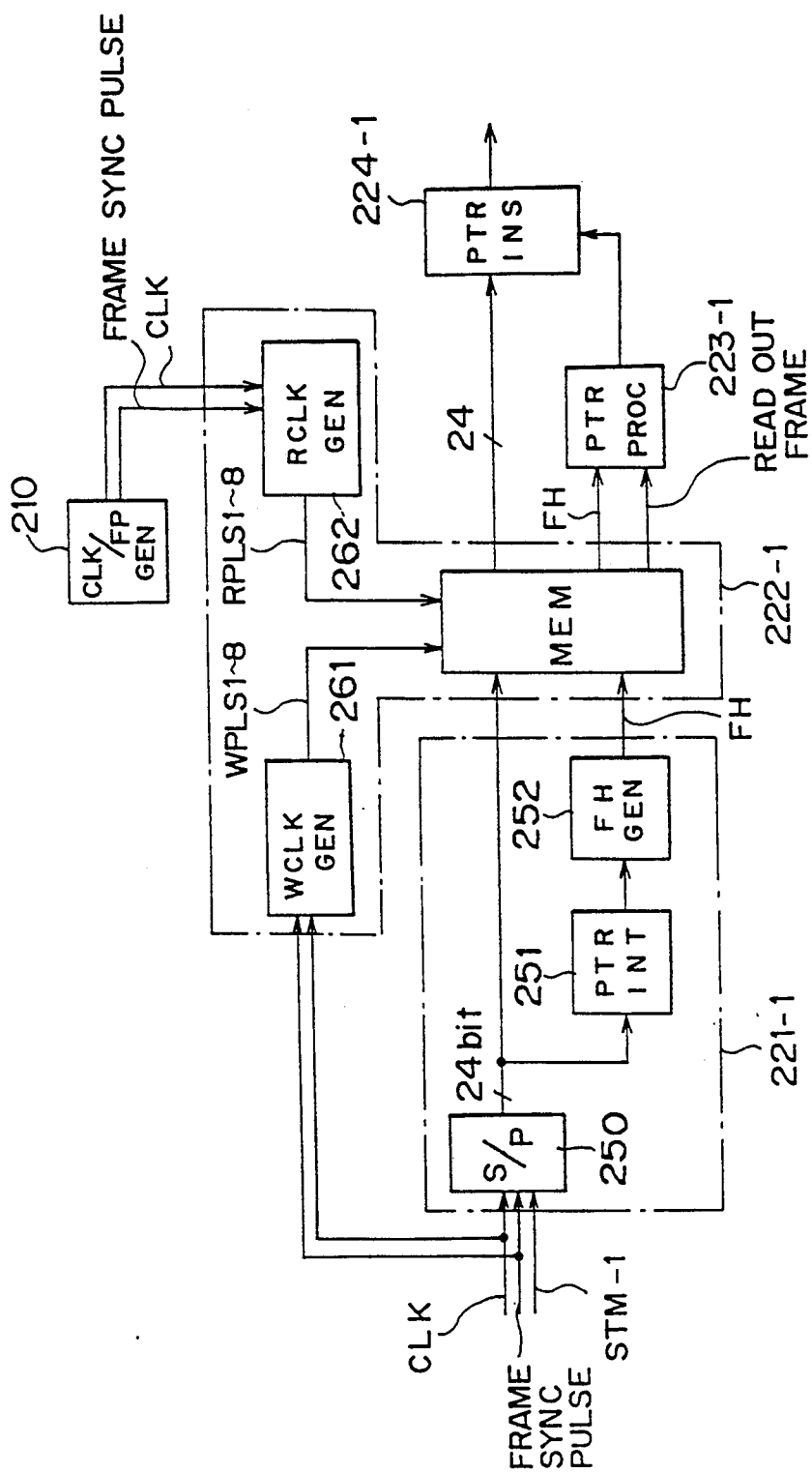
FIG. 3 illustrates a block diagram of an important part of a pointer conversion unit in the above embodiment.
Figure 6A:
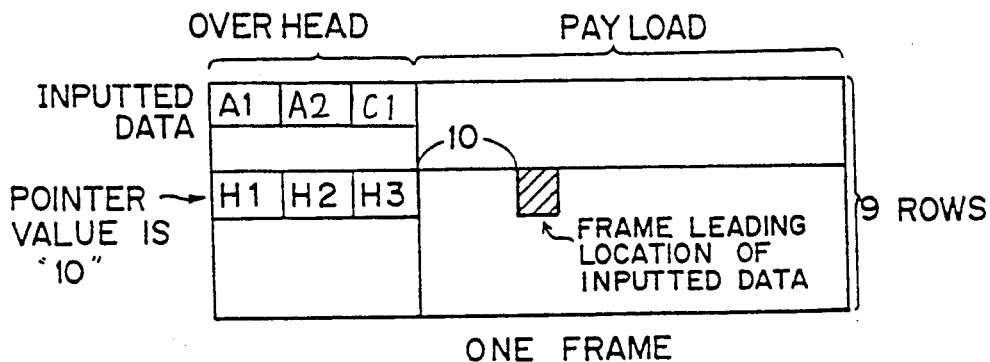
Figure 6B:
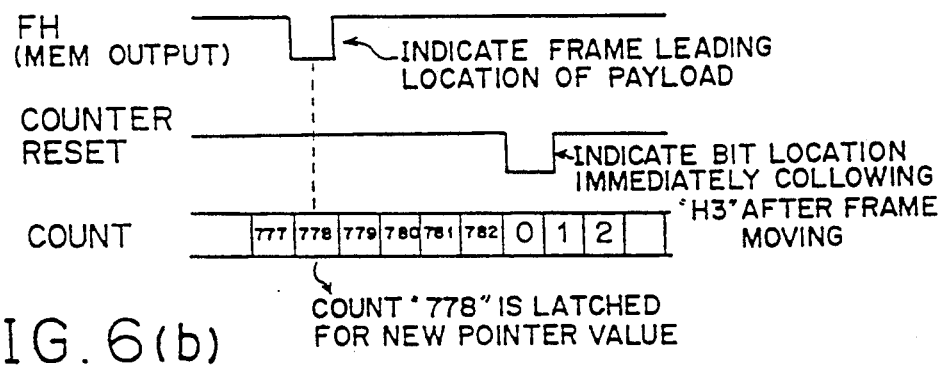
Figure 6C:
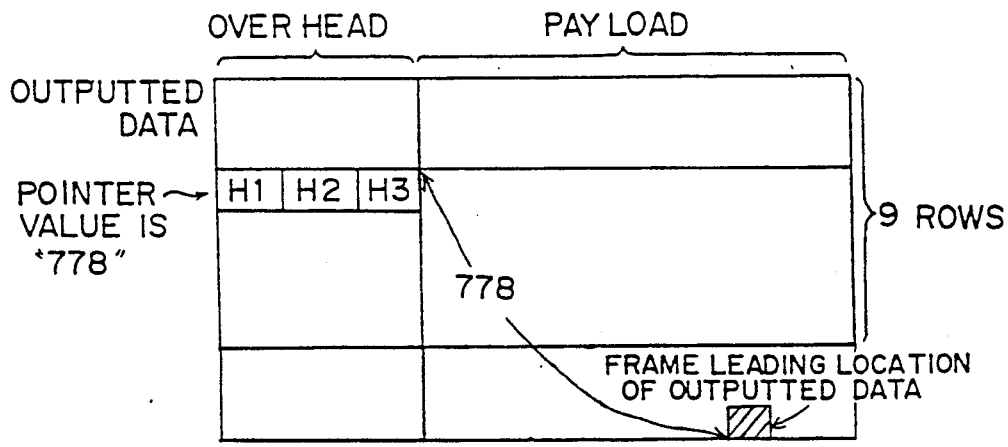

FIG. 3 illustrates the pointer insertion section 221-1, the memory circuit 222-1, the pointer processing unit 223-1 and the pointer insertion unit 224-1 in the pointer conversion section 220. FIG. 4 to FIG. 6 are timing charts showing the operations of these components.

In FIG. 3, the STM-1 signal, the clock signal and the frame synchronous pulse from the selection circuit 40-1 are converted to a twenty-four bit parallel signal in the S/P (serial/parallel conversion) circuit 250. At this time, the bit rate of each parallel signal is slowed down to 6.48 Mb/S (=155.52 Mb/S÷24) as shown in FIG. 4. The serial-parallel conversion starts when a frame synchronous pulse is inputted.

The pointer interpretation circuit 251 detects the location of the pointers H1, H2, H3 based on the parallel signal from the STM-1 signal. In the case of the STM-1 signal, it is easy to detect the pointer location because the number of bits the pointer is located from the frame synchronous pulse A1–A3 is predetermined. The frame header(FH) generation circuit 252 detects the frames leading to the location of the data strings in the payload which follows H3 in the pointer overhead. This then generates the frame header pulse FH in the corresponding time slot. The frame header pulse FH is stored in the memory MEM and is read out by a reading clock pulse which is generated immediately after the storage operation.

The memory MEM has twenty-four 8 bit parallel-input/parallel-output FIFO memories or registers and can temporally store twenty-four parallel signals (refer to FIG. 4) from the S/P circuit 250 in the corresponding MEM. This operation is performed by the writing clocks WPLS1 to WPLS from the writing clock generator 261 which are shown in FIG. 5. While FIG. 5 shows only one input of the twenty-four parallel signals, all of the twenty-four parallel signals are written in the twenty-four 8 bit parallel input/output memories by the writing clocks WPLS1 to WPLS8. The writing clocks WLPS1 to WLPS8 are not generated during the overhead (OH), but are repeatedly generated during the payload. Therefore, overhead OH is not stored in the memory MEM. Every cycle of the writing clocks WPLS1 to WPLS8 consists of 8 bits, and generates while shifting by one bit. The memory MEM writes new data at every rising edge of WPLS1 to WPLS8. (The length in which the memory can store one bit is longer than the length of the overhead.)

The readout of the memory MEM is performed at a time when either of the reading clocks RPLS1 to RPLS8 from the reading clock generator 262 are at low levels. The reading clocks RPLS1 to RPLS8 generate in synchronization with the clock signal of the pulse generator 210. During the overhead period, the readout period (low level) extends as long as the length of the overhead. The overhead period appears at 90 bit cycle.

The pointer processing section 223-1 has a counter which is reset to "0" just after detecting the location of the third H3 in the pointer overhead of each frame, as determined from the readout frame (the frame synchronous pulse of the pulse generator 210). (Refer to FIG. 6). When the frame header pulse FH is supplied from the MEM, the counter value (778), which shows the frame leading location of the payload, is inserted into the pointer insertion section 224-1 (FIG. 6(b), (c)). The output of the pointer insertion section 224-1 has no overhead other than the pointers (FIG. 6(c)), but the multiplexing circuit 231 inserts or multiplexes the other required overhead at locations which are reserved as shown in the memory output portion of FIG. 5.

The receiving side (not shown) separates the multiplexed signals, detects the pointer location from each of the separated STM-1 signals and calculates the frame leading location of the payload by using the pointer value.

According to this invention, the standby transmission unit 200 does not shift the phase of the entire frame so as to bring the frame into synchronization with the frame synchronous pulse but instead modifies the pointer value in response to the clock of that unit.

It is not intended to limit the present invention to the specific embodiments described above. It is recognized that changes may be made in the circuits and processes specifically described herein without departing from the scope of this invention. This invention is intended to encompass all other embodiments, alternatives, and modifications consistent with the invention.

What is claimed is:

1. A synchronous terminal station system comprising working transmission units and one or more standby transmission units, the working and standby transmission units operating with respective independently generated synchronization pulses;
1) each of the working transmission units comprising:
    (a) means for receiving and outputting a plurality of input signals, each of the input signals having a frame format including pointer information that indicates the location in the frame where the informative data portion begins;
    (b) means for multiplexing the signals outputted from the receiving means into a transmission signal and outputting the transmission signal;
    (c) means for transmitting the transmission signal outputted from the multiplexing means onto a transmission path;
    (d) means for detecting a failure in the respective working transmission unit; and
    (e) means for applying the signals outputted from the receiving means to one of the standby transmission units when the means for detecting detects a failure; and
2) each of the standby transmission units comprising:
    (a) means for receiving the signals applied by the means for applying the signals;
    (b) means for reformatting the applied signals into new frames according to the synchronization pulse of the standby transmission unit receiving the applied signals;
    (c) means for determining the location of the pointer information in the respective new frames;
    (d) means for modifying the pointer information based on the determined location, and inserting the modified pointer information into the signals having the new frames;
    (e) means for multiplexing the signals having the modified pointer information into a standby transmission signal; and
    (f) means for transmitting the standby transmission signal onto a standby transmission path.

2. A synchronous terminal station system as in claim 1, wherein the means for applying the signals of each of the working transmission units comprises means to transmit input signals to one of the standby transmission units associated with each working transmission unit, the means to transmit input signals comprising:
    means for selecting one of a set of input signals from the working transmission unit with which it is associated, and a set of input signals from another of the working transmission units, and outputting the selected sets of input signals; wherein the working transmission units are connected to one another in a cascade via the selecting means.

3. A synchronous terminal station system as in claim 2, wherein there is one standby transmission unit.

4. A synchronous terminal station system as in claim 3, wherein the input signals are synchronous transport module-N signals.

5. A method for converting input signals using a synchronous terminal station system comprising a plurality of working transmission units and one or more standby transmission units, with the working and standby transmission units operating with respective independently generated synchronization pulses;
1) each of the working transmission units comprising:

(a) means for receiving a plurality of input signals, formatting the input signals into frames, each of the frames having pointer information indicative of the location in the frame where a concerned informative data portion begins, and outputting the formatted input signals;

(b) means for multiplexing the input signals outputted from the means for receiving into a transmission signal;

(c) means for transmitting the transmission signal onto a transmission path;

(d) means for detecting a failure in the respective working transmission unit; and (e) means for applying the input signals to one of the standby transmission units when the means for detecting detects a failure; and 2) wherein the method for converting the input signals comprises the steps of:

(a) receiving the applied signals from the respective working transmission unit in the corresponding standby transmission unit;

(b) reformatting the applied signals into new frames according to the synchronization pulse of the corresponding standby transmission unit;

(c) determining the locations of the pointer information for the applied signals, relative to the new frames; and (d) modifying the pointer information for the applied signals based on their determined locations.

6. A synchronous terminal station system of an N:1 redundancy configuration type having first to N-th ($N \geq 2$) working active signal processing units with each adjusting one or more input signals to a particular predetermined frame phase, generating a working transmission path signal, and sending these signals to a working transmission path; the system also comprising a standby signal processing unit, which becomes active when one of the N-th working signal processing units fails to receive signals from a failing working signal processing unit, the standby signal processing unit then generates a standby transmission path signal, and then sends out the same to a standby transmission path; wherein 1) an n-th ($1 \leq n \leq N$) working signal processing unit comprises:

(a) an n-th working clock means for generating an n-th working clock signal within the n-th working signal processing unit;

(b) an n-th interface, for adjusting the input signals of the n-th working signal processing unit to a frame phase generated by the n-th working clock and then outputting the input signals as output signals;

(c) an n-th branching circuit for branching the output signals of the n-th interface into two sets of branched signals, and outputting the sets of branched signals;

(d) an n-th working transmission circuit, for generating an n-th working transmission path signal from one set of branched signals and sending out the respective n-th working transmission path signal to an n-th active transmission path; and (e) an n-th selection circuit selectively sending out another set of branched signals to a standby signal processing unit; and 2) the standby signal processing unit comprises:

(a) a standby clock for generating a standby clock signal;

(b) a pointer modification circuit to move the signals received from the n-th selection circuit onto a clock signal from the standby clock, modify pointer information in the signals indicative of the location in a frame of informative data portion and output the modified signals; and (c) a standby transmission circuit for generating a standby transmission path signal from the outputted signals of the pointer modification circuit, and sending out the standby transmission path signal to a standby transmission path.

7. A signal transmission method, comprising:

1) providing a synchronous terminal station system of an N:1 redundancy configuration type having first to N-th ($N \geq 2$) working signal processing units, each of the working signal processing units:

(a) adjusting one or more input signals to a predetermined frame phase;

(b) generating a working transmission path signal; and (c) sending out the working transmission path signal to a working transmission path; and 2) providing a standby signal processing unit having a frame phase, the standby signal processing unit:

(a) receiving signals from one of the first to N-th working signal processing units that has failed to generate a working transmission path signal; and (b) sending out a standby transmission path signal to a standby transmission path;

wherein the standby signal processing unit further modifying the value of pointer information, indicative of the location in a frame of informative data, according to the frame phase of the standby signal processing unit.

* * * * *